(12) United States Patent
Murase et al.

(10) Patent No.: US 7,742,256 B2
(45) Date of Patent: Jun. 22, 2010

(54) CARTRIDGE SLOT DOOR MECHANISM FOR COVERING CARTRIDGE SLOT

(75) Inventors: Kazuhide Murase, Atsugi (JP); Kazuya Tamura, Atsugi (JP); Ryoichi Annen, Atsugi (JP); Hirofumi Asai, Atsugi (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 336 days.

(21) Appl. No.: 11/508,589

(22) Filed: Aug. 22, 2006

(65) Prior Publication Data

US 2007/0091503 A1  Apr. 26, 2007

(30) Foreign Application Priority Data

Oct. 25, 2005  (JP) .............................. 2005-310328

(51) Int. Cl.
G11B 5/008 (2006.01)
(52) U.S. Cl. .................................................. 360/96.51
(58) Field of Classification Search ........................ None
See application file for complete search history.

(56) References Cited

U.S. PATENT DOCUMENTS

| 4,817,079 | A | * | 3/1989 | Covington | ................... 720/728 |
| 4,933,790 | A | * | 6/1990 | Mitumaru | ................ 360/96.51 |
| 5,229,987 | A | * | 7/1993 | Aoki | .......................... 720/647 |
| 5,701,216 | A | * | 12/1997 | Yamamoto et al. | ....... 360/99.02 |
| 6,411,583 | B1 | * | 6/2002 | Yamamoto et al. | .......... 720/647 |

FOREIGN PATENT DOCUMENTS

JP  61-72758  5/1986

* cited by examiner

Primary Examiner—David D Davis
(74) Attorney, Agent, or Firm—Ladas & Parry LLP

(57) ABSTRACT

A cartridge slot door mechanism is disclosed that covers a cartridge slot arranged at a front panel of a frame. The cartridge slot door mechanism includes an upper door having an upper side supported by the front panel, and a lower door having a lower side supported by the front panel. The upper door and the lower door are configured to open toward the inner side of the frame, and a lower side portion of the upper door and an upper side portion of the lower door are arranged to overlap.

10 Claims, 17 Drawing Sheets

CARTRIDGE SLOT DOOR MECHANISM FOR COVERING CARTRIDGE SLOT

CROSS-REFERENCE TO RELATED APPLICATIONS

This application claims priority to Japanese Patent Application No. 2005-310328, filed Oct. 25, 2005, the disclosure of which is incorporated herein by reference in its entirety.

BACKGROUND OF THE INVENTION

1. Field of the Invention

The present invention relates to a cartridge slot door mechanism of a magnetic recording/playback apparatus.

2. Description of the Related Art

A streamer apparatus corresponding to a type of magnetic recording/playback apparatus that uses a tape cartridge and includes a rotating drum and a tape loading mechanism like the VTR is being commercialized for use as an external storage device of a computer.

The streamer apparatus has a tape cartridge slot arranged at its front panel for enabling insertion of a tape cartridge, and a door is arranged at the tape cartridge slot for preventing dust and other particles from entering through the tape cartridge slot. The door is configured to be pushed toward the inner side of the streamer apparatus by the tape cartridge being inserted.

Although the current streamer apparatus has a relatively large storage capacity of 72 GB at compression mode, for example, there is an ever growing demand for increased storage capacity, and in turn, manufacturers are developing techniques for increasing the storage capacity of the streamer apparatus. One way of increasing the storage capacity involves enabling the use of a new tape cartridge that accommodates a magnetic tape with a greater tape width compared to the tape width of the magnetic tape of the current tape cartridge.

It is noted that since the streamer apparatus is installed in a machine, its dimension in the depth direction is preferably arranged to be relatively short.

The tape cartridge slot door mechanism of a conventional streamer apparatus typically comprises a single door.

Upon adapting the streamer apparatus to enable use of the new tape cartridge, since the height of the new tape cartridge is greater than the height of the current tape cartridge, the dimension of the tape cartridge slot in the height direction has to be increased. That is, the width of the door of the tape cartridge slot has to be increased, and in turn, more space is needed at the inner side of the front panel of the streamer apparatus for enabling the door to adequately open and close. As a result, the dimension of the streamer apparatus in the depth direction has to be increased.

In this respect, a door mechanism has been developed in which the door is divided into an upper door and a lower door that are configured to rotate in opposite directions to be pushed and opened by a tape cartridge inserted through the tape cartridge slot. In this door mechanism, the respective width dimensions of the upper door and the lower door may be reduced compared to that of a single door and the space at the inner side of the front panel for opening and closing the door may be reduced. As a result, the depth dimension of the streamer apparatus may not have to be increased.

However, in the conventional door mechanism including an upper door and a lower door, extending edges of the upper and lower doors are arranged to oppose each other when the door mechanism is closed. In this case, a gap is created between the lower edge of the upper door and the upper edge of the lower door so that the door mechanism may not effectively prevent dust and other particles from entering through the tape cartridge slot.

SUMMARY OF THE INVENTION

According to an aspect of the present invention, a cartridge slot door mechanism with an upper door and a lower door is provided that is capable of adequately preventing dust and other particles from entering through the cartridge slot.

According to a specific embodiment of the present invention, a cartridge slot door mechanism is provided that covers a cartridge slot arranged at a front panel of a frame, the cartridge slot door mechanism including:

an upper door having an upper side supported by the front panel; and a lower door having a lower side supported by the front panel;

wherein the upper door and the lower door are configured to open toward an inner side of the frame; and a lower side portion of the upper door and an upper side portion of the lower door are arranged to overlap.

According to one aspect of the present invention, by arranging the lower side portion of the upper door and the upper side portion of the lower door to overlap, dust and other particles may be prevented from entering through the cartridge slot, for example.

DETAILED DESCRIPTION OF THE PREFERRED EMBODIMENTS

In the following, preferred embodiments of the present invention are described with reference to the accompanying drawings.

[Streamer Apparatus 30]

Figure 16:
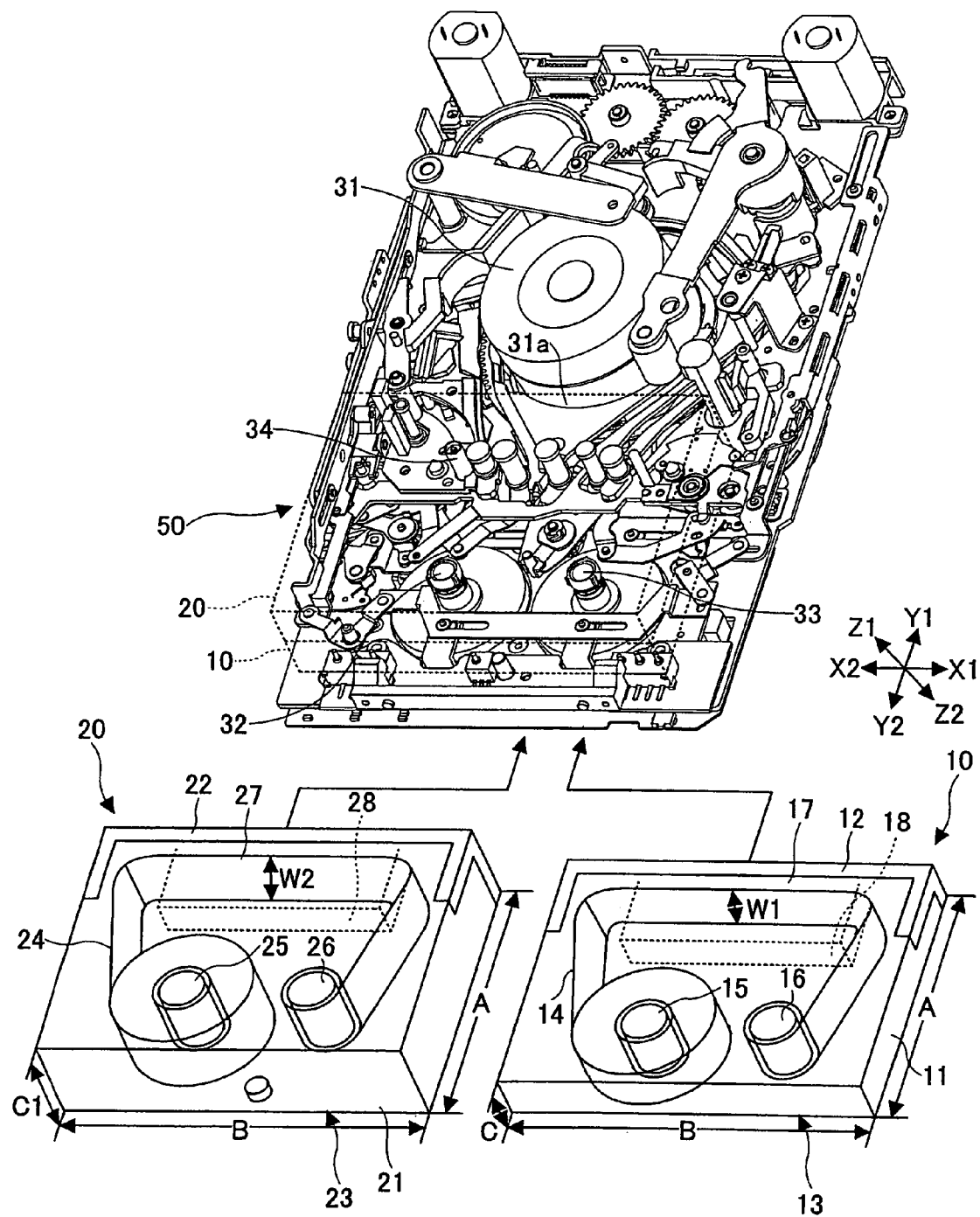
FIG. 16 is a diagram showing a streamer apparatus to which the tape cartridge slot door mechanism of the present embodiment may be applied along with a current tape cartridge and a new tape cartridge.

In the following, a streamer apparatus 30 to which a tape cartridge slot door mechanism 60 according to an embodiment of the present invention may be applied is described with reference to FIGS. 16 and 17. It is noted that in these drawings, directions X1-X2 represent width directions, directions Y1-Y2 represent depth directions, and directions Z1-Z2 represent height directions.

The streamer apparatus 30 includes a rotating drum 31, a magnetic tape loading mechanism 34 configured to pull out a magnetic tape from an inserted tape cartridge and load the magnetic tape into a predetermined tape path, reel shafts 32 and 33, and a tape cartridge holder 50 that is capable of properly holding a first cartridge corresponding to a current tape cartridge 10 and a second cartridge corresponding to a new tape cartridge 20.

The current tape cartridge 10 has outer dimensions of length A×width B×height C. The current tape cartridge 10 includes a cartridge main frame 13 having a box structure 11, a front side lid 12, and a bottom slide plate (not shown); a magnetic tape 14 accommodated inside the main frame 13 and having a width W1 of 4 mm, the magnetic tape 14 being wound around a supply reel 15 and a winding reel 16 and forming a tape path 17 along the inner face of the lid 12; and a pole accommodating space 18 at the front face side of the bottom plate of the main frame 13 that is configured to open when the current tape cartridge 10 is loaded.

The new tape cartridge 20 has outer dimensions of length A×width B×height C1. The new tape cartridge 20 includes a cartridge main frame 23 made of a box structure 21, a front side lid 22, and a bottom slide plate (not shown); a magnetic tape 24 accommodated inside the main frame 23 and having a width W2 of 8 mm, the magnetic tape 24 being wound around a supply reel 25 and a winding reel 26 and forming a tape path 27 along the inner face of the lid 22; and a pole accommodating space 28 at the front face side of the bottom plate of the main frame 23 that is configured to open when the new tape cartridge 20 is loaded. It is noted that the length A and the width B of the new tape cartridge 20 are the same as the length A and the width B of the current tape cartridge 10, and the height C1 of the new tape cartridge 20 is 1.5 times the height C of the current tape cartridge 10.

Figure 17:
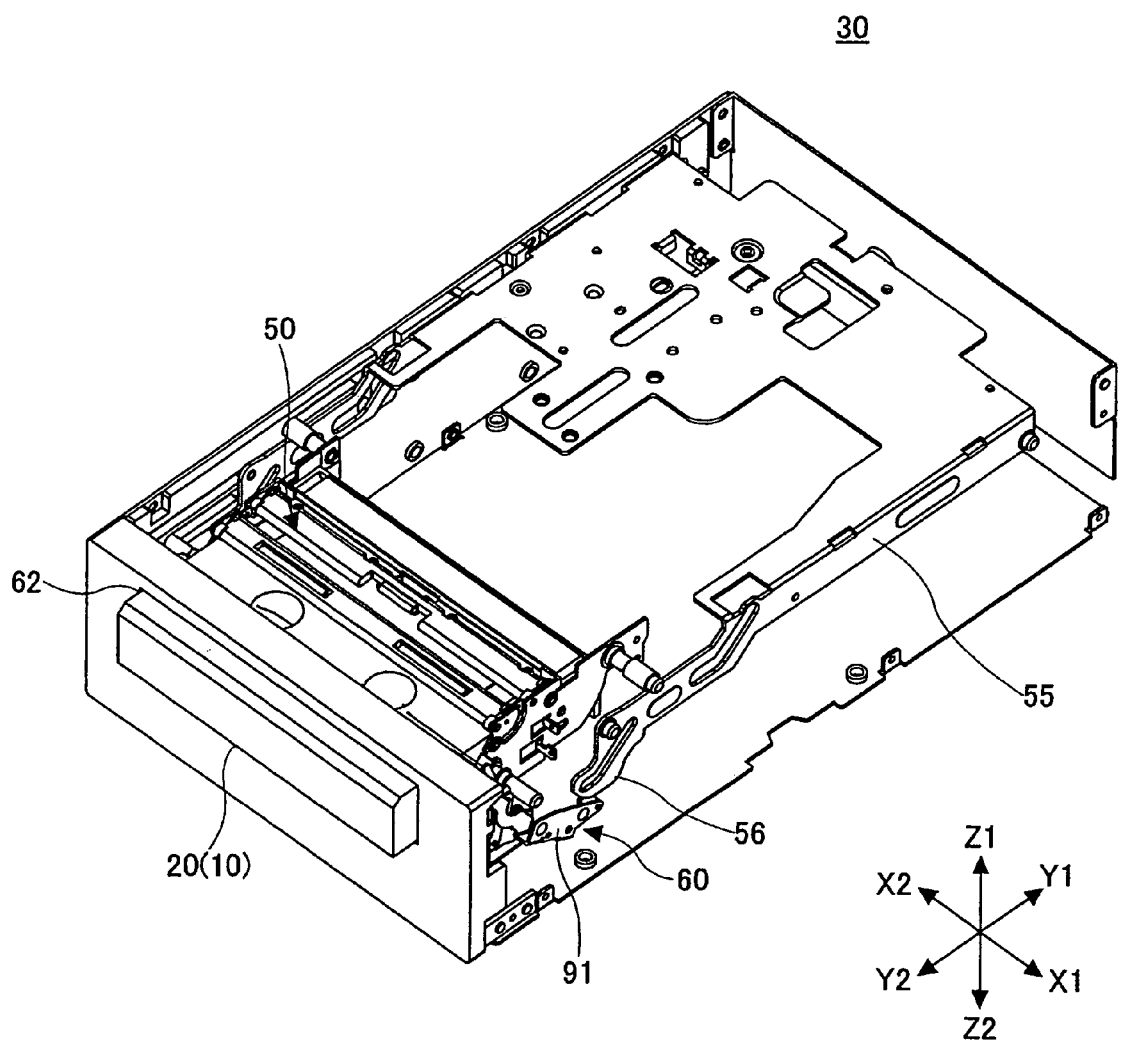
FIG. 17 is a perspective view of the streamer apparatus of FIG. 16 having the current tape cartridge inserted therein.

When an operator inserts the new tape cartridge 20 into the tape cartridge slot up to a position as is shown in FIG. 17, a motor is activated and a tape cartridge loading mechanism is operated so that a cam plate 55 moves in the Y1 direction, the tape cartridge holder 50 first is moved in the Y1 direction and then the Z2 direction, and the tape cartridge 20 is moved along with the tape cartridge holder 50 to engage the reel shafts 32 and 33 to be loaded into the streamer apparatus 30.

Then, a magnetic tape is drawn from the new tape cartridge 20 by the magnetic tape loading mechanism 34 and is loaded into a predetermined path after which information recording/playback is performed by the rotating drum 31.

When an ejection command is issued, the motor is activated to rotate in a reverse direction, and the tape cartridge loading mechanism is operated to move in a reverse direction so that the cam plate 55 is moved in the Y2 direction. In turn, the tape cartridge holder 50 is first moved in the Z1 direction and then the Y2 direction, and the tape cartridge 20 is moved along with the tape cartridge holder 50 so that a portion thereof protrudes output of the tape cartridge slot 62. In this way, the operator may catch hold of the protruding portion of the tape cartridge 20 to pull and eject the tape cartridge 20 from the streamer apparatus 30.

It is noted that the streamer apparatus 30 performs similar operations as described above in the case where the current tape cartridge 10 is inserted and ejected.

As is described below, an upper door and a lower door is arranged at the tape cartridge slot. During tape cartridge loading, the upper door and the lower door are configured to be pushed open toward the inner side of the streamer apparatus 30 by the tape cartridge 10 or 20 that is being inserted through the tape cartridge slot. During tape cartridge ejection, the upper door and the lower door are opened toward the inner side of the streamer apparatus 30 by a mechanism so that the tape cartridge 10 or 20 that is currently loaded may be guided through the tape cartridge slot to protrude outward.

[Tape Cartridge Slot Door Mechanism 60]

Figure 1:
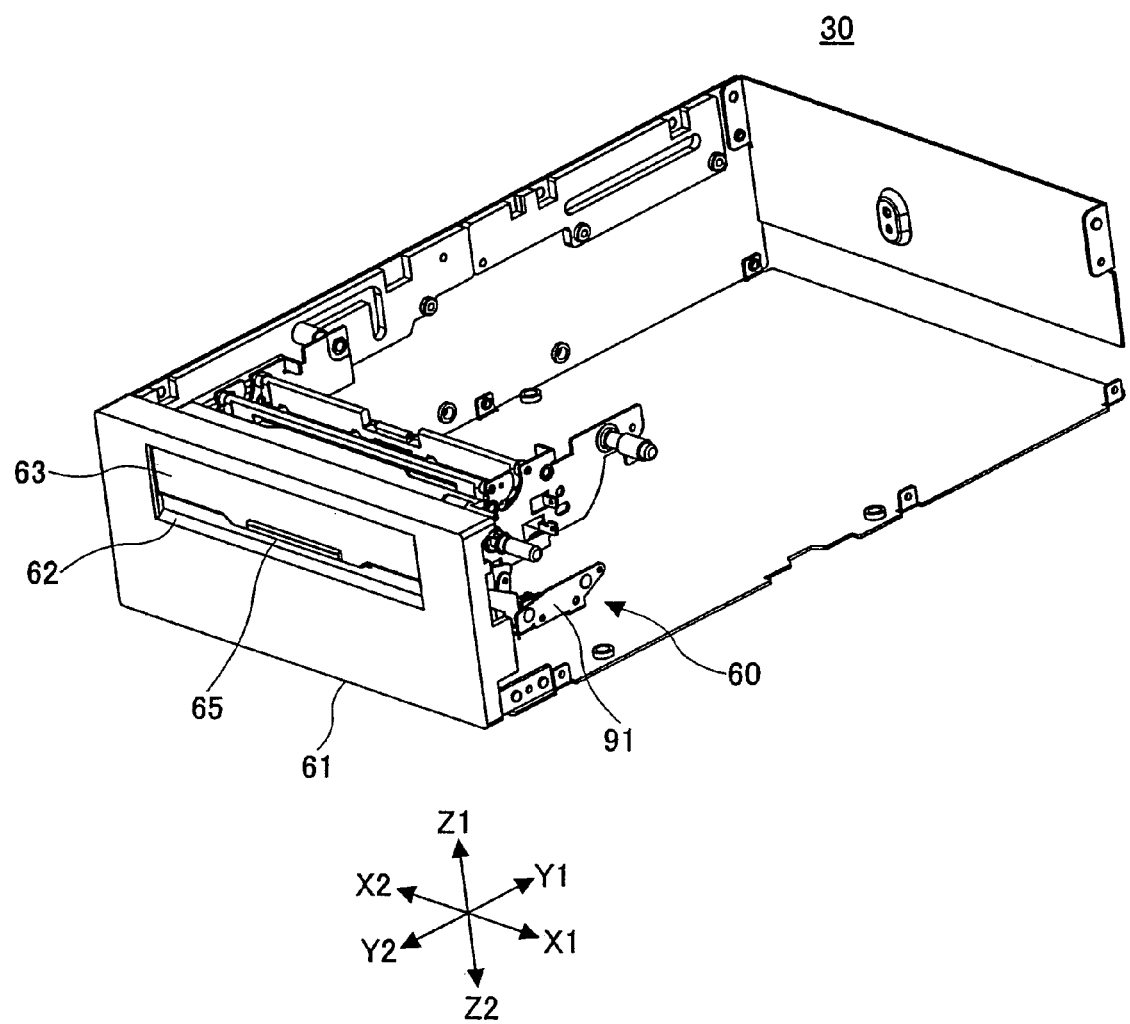
FIG. 1 is a perspective view of a tape cartridge slot door mechanism according to an embodiment of the present invention.

FIG. 1 is a perspective view of the tape cartridge slot door mechanism 60 according to an embodiment of the present invention and a frame of the streamer apparatus 30.

Figure 2:
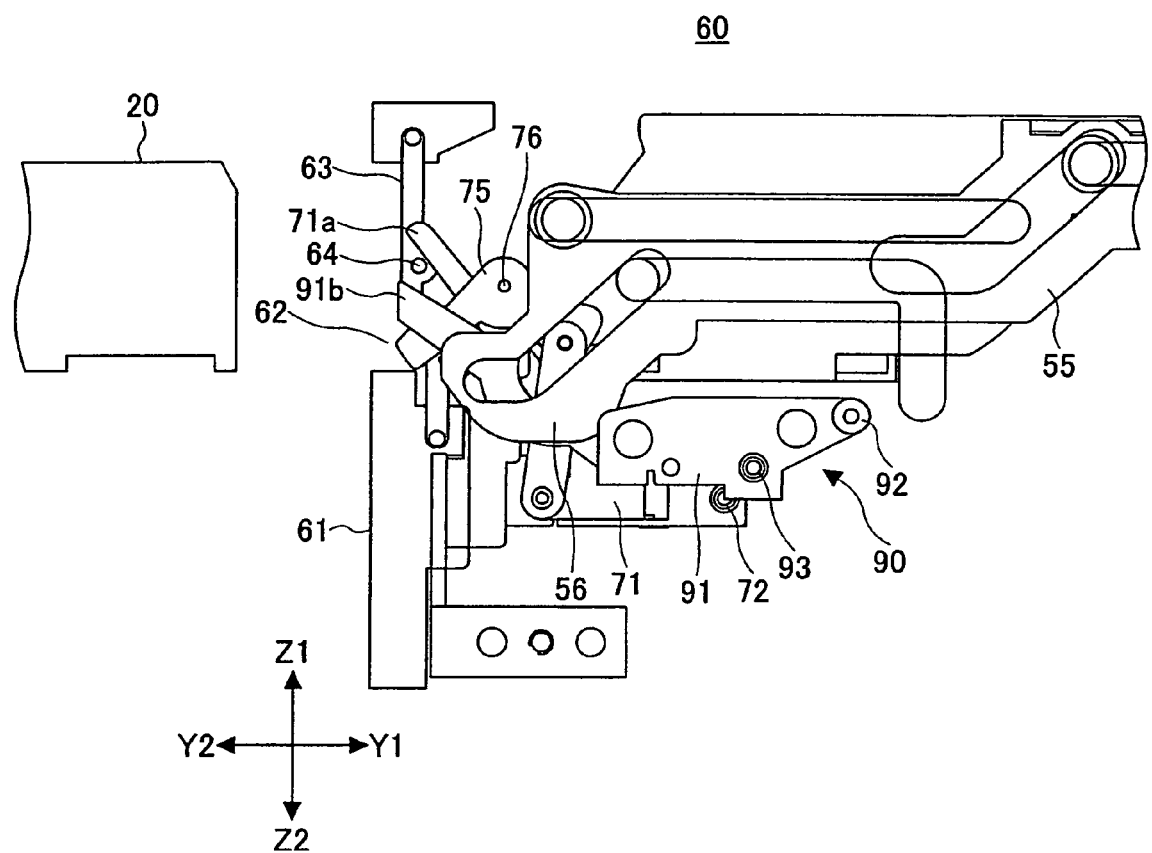
FIG. 2 is a side view of the tape cartridge slot door mechanism of FIG. 1.
Figure 3:
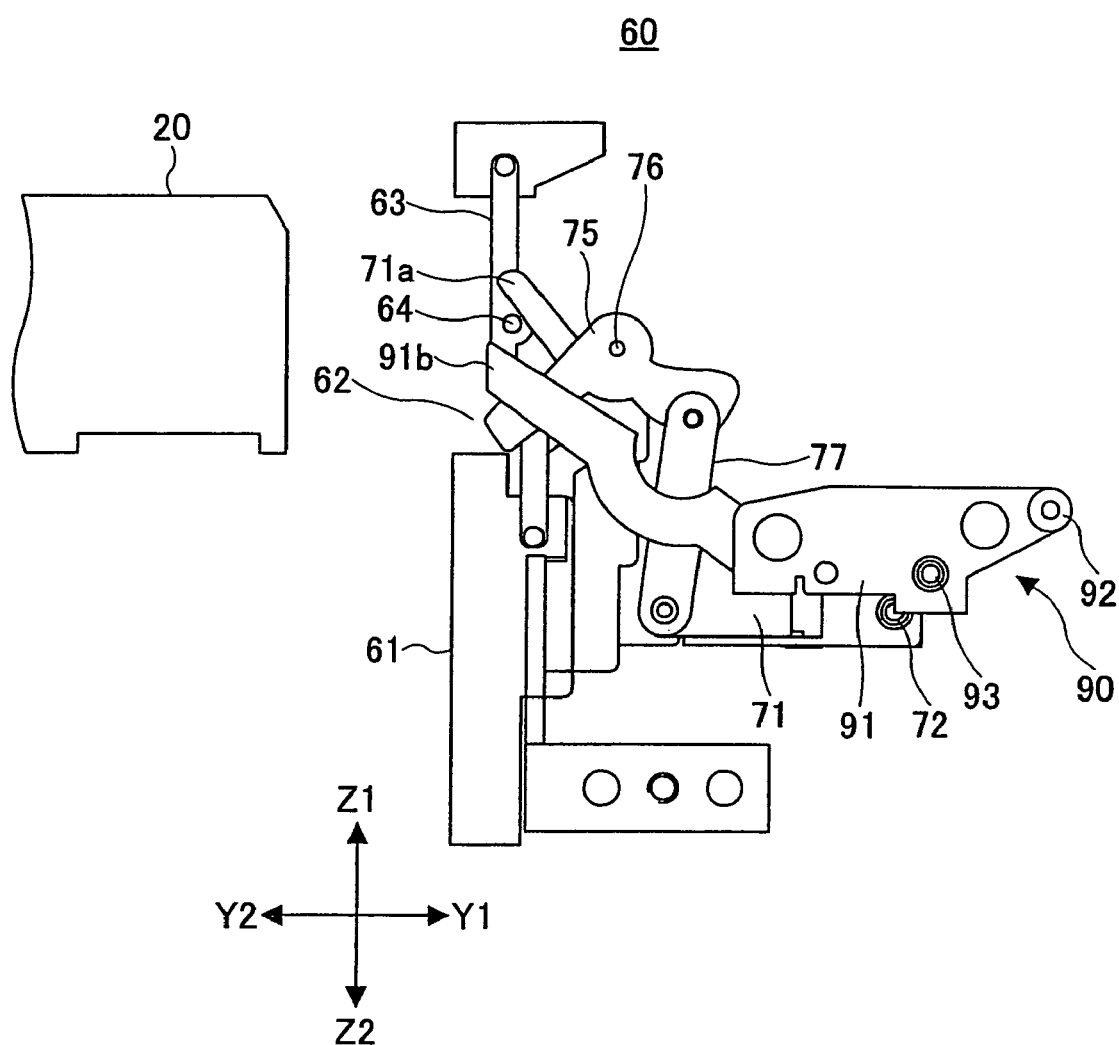
FIG. 3 is a side view of the tape cartridge slot door mechanism of FIG. 2 with a cam plate removed.
Figure 4:
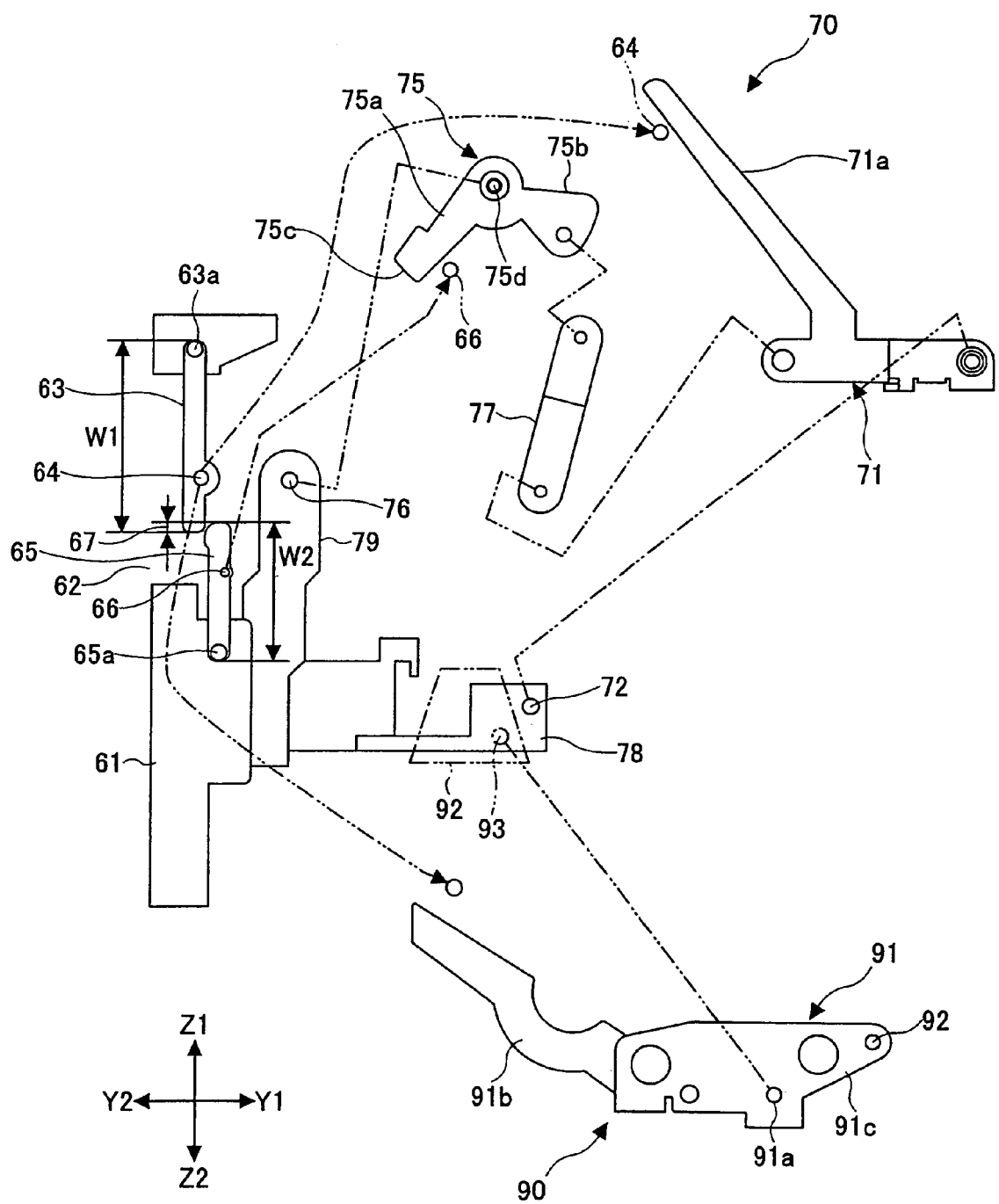
FIG. 4 is an exploded view of the tape cartridge slot door mechanism.

FIG. 2 is a side view of the tape cartridge slot door mechanism 60. FIG. 3 is a side view of the tape cartridge slot door mechanism 60 with a cam portion 56 removed. FIG. 4 is an exploded view of the door mechanism 60.

Figure 5A:
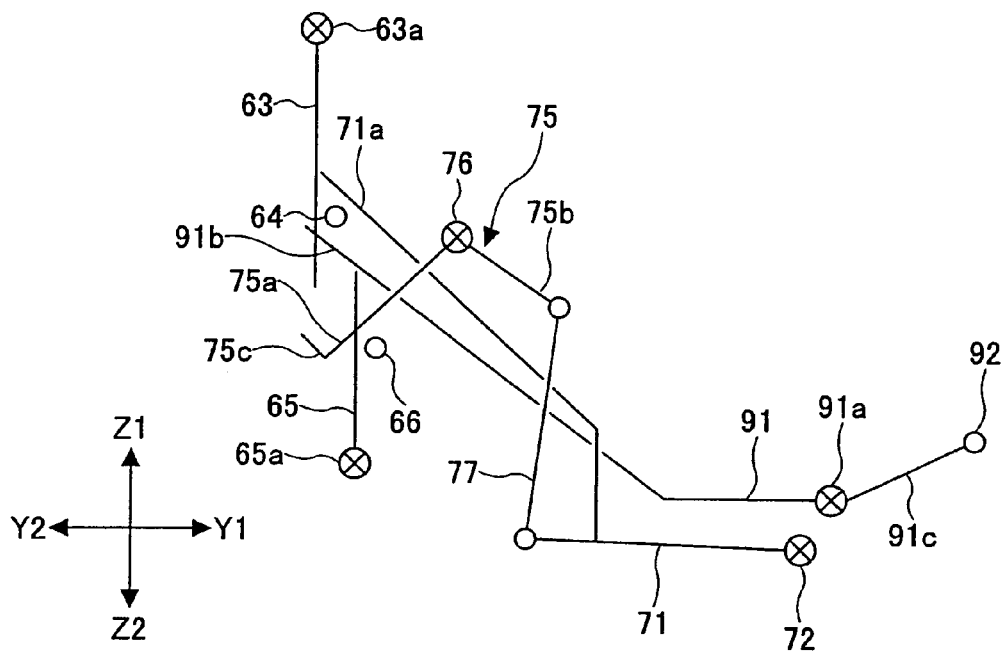
FIGS. 5A and 5B are skeletal views of the tape cartridge slot door mechanism, FIG. 5A showing the tape cartridge slot door mechanism at an initial stage, and FIG. 5B showing the tape cartridge slot door mechanism at a fully open position.
Figure 5B:
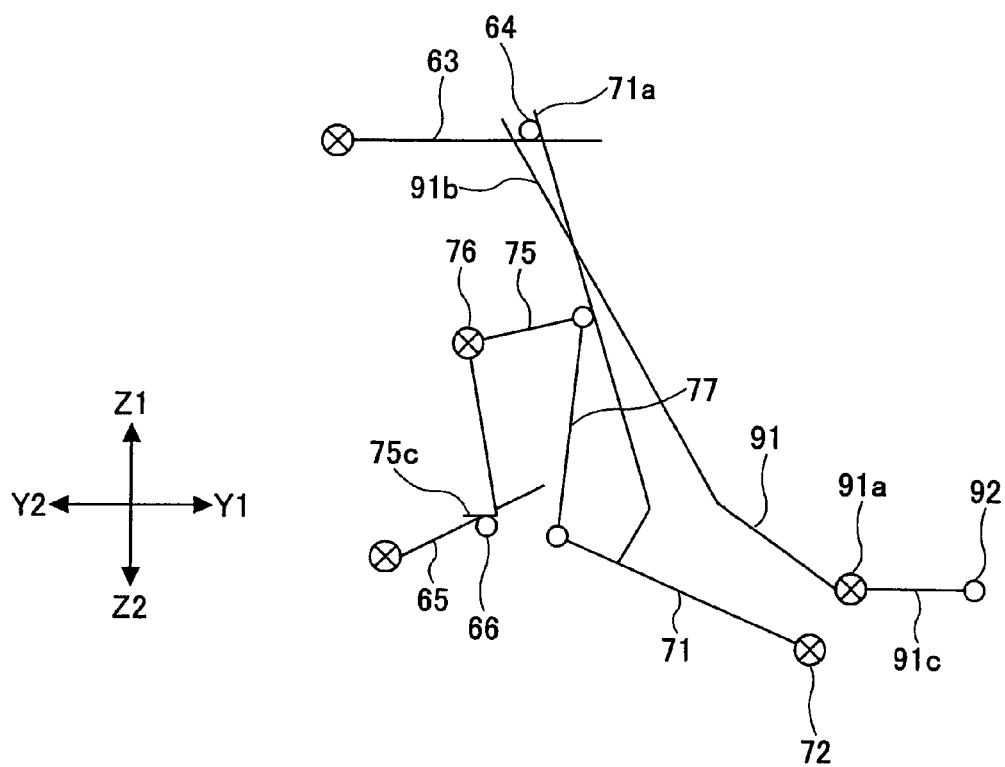
Figure 6A:
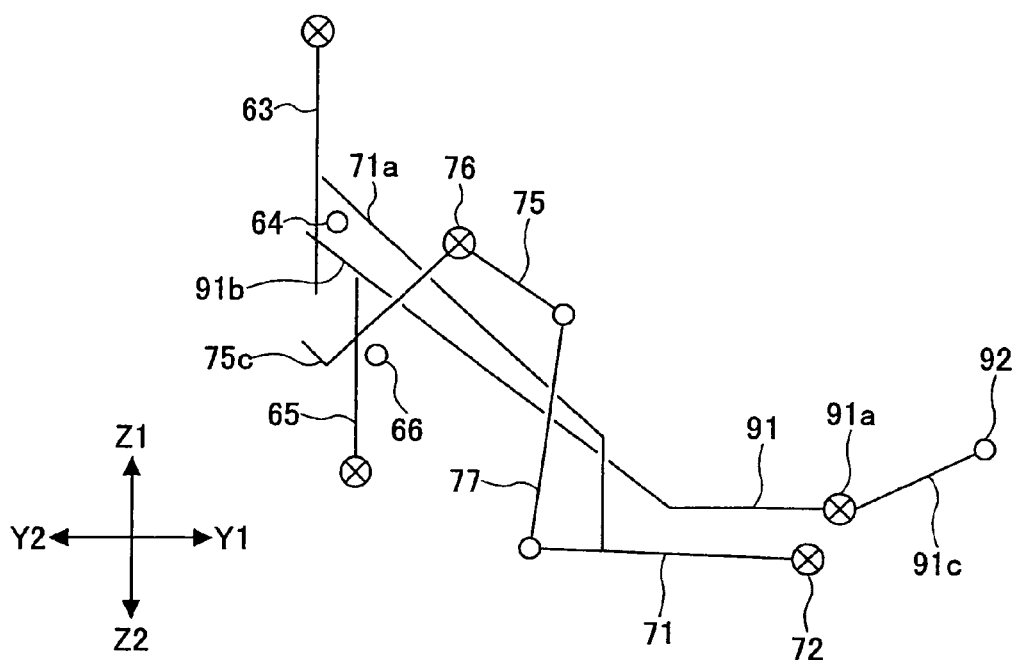
FIGS. 6A and 6B are skeletal views of the tape cartridge slot door mechanism, FIG. 6A showing the tape cartridge slot door mechanism when a tape cartridge is loaded, and FIG. 6B showing the tape cartridge slot door mechanism when ejection of the tape cartridge is started.
Figure 6B:
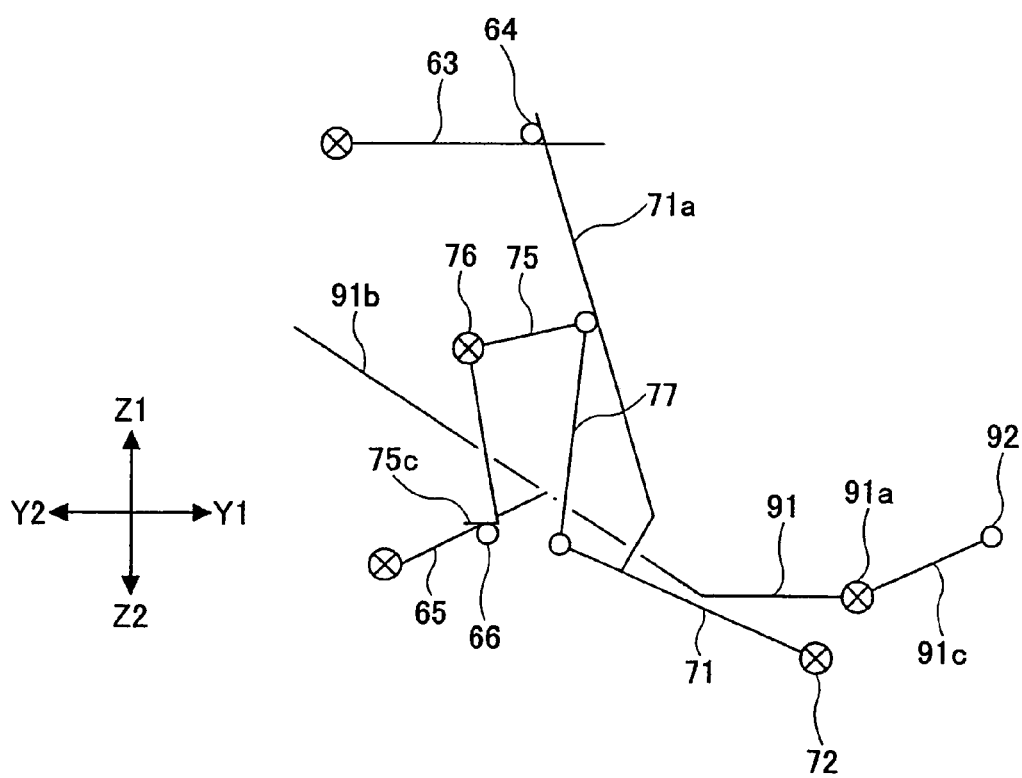

FIGS. 5A, 5B, 6A, and 6B are skeletal views of the tape cartridge slot door mechanism 60. FIG. 5A shows the tape cartridge slot door mechanism 60 before a tape cartridge is inserted. FIG. 5B shows the tape cartridge slot door mechanism 60 when a tape cartridge is inserted into the tape cartridge slot. FIG. 6A shows the tape cartridge slot door mechanism 60 when the tape cartridge is loaded. FIG. 6B shows the tape cartridge slot door mechanism 60 when ejection of the tape cartridge is started.

As is shown in FIGS. 1 through 4, a tape cartridge slot 62 having dimensions corresponding to the dimensions of the new tape cartridge 20 is arranged at a front panel 61 of the streamer apparatus 30.

The door mechanism 60 includes an upper door 63, a lower door 65, an interlocking mechanism 70 that interlocks the upper door 63 and the lower door 65 so that the lower door 65 opens when the upper door 63 opens, and an upper door opening mechanism 90 that opens the upper door 63.

[Upper Door 63 and Lower Door 65]

The upper door 63 and the lower door 65 are arranged at the inner side of the front panel 61. The upper door 63 has a width W1 and includes a Z1 side shaft 63a that is rotatably supported by the front panel 61. The upper door 63 is arranged at the Z1 side of the tape cartridge slot 62 and covers more than half of the open area of the tape cartridge slot 62. The lower door 65 has a width W2 and includes a Z2 side shaft 65a that is rotatably supported by the front panel 61. The lower door 65 covers the remaining Z2 side open area of the tape cartridge slot 62 that is not covered by the upper door 63. The width W1 of the upper door 63 is preferably around 1.5 times greater than the width W2 of the lower door 65 (i.e., W1>W2). It is noted that in the present embodiment, a Z1 side portion of the lower door 65 is arranged to overlap with a Z2 side portion of the upper door 63 as is shown in FIG. 4 (i.e., see overlapping portion 67). Also, a pin 64 is arranged at the X1 side edge of the upper door 63, and a pin 66 is arranged at the X1 side edge of the lower door 65. The upper door 63 and the lower door 65 have a force applied in the closing direction by spring members (not shown).

[Interlocking Mechanism 70]

As is shown in FIGS. 3, 4, and 5A, the interlocking mechanism 70 includes an upper door lever 71 that is correlated with the upper door 63, a lower door lever 75 that is correlated with the lower door 65, and a link 77 that is connected to the upper door lever 71 and the lower door lever 75.

The upper door lever 71 includes an arm portion 71a that branches out from its main portion. The Y1 side of the upper door lever 71 is rotatably supported by a stationary pin 72 arranged at a bracket 78 disposed at the inner side of the front panel 61. The upper door lever 71 has a force applied in the counterclockwise direction by a spring (not shown).

The lower door lever 75 is arranged into a V-shape, and includes a first arm portion 75a and a second arm portion 75b. The first arm portion 75a has a stop portion 75c arranged at its extending end. The stop portion 75c forms a portion of a circular arc of a circle centered around a hole 75d. The lower door lever 75 has the hole 75d rotatably supported by a stationary pin 76 arranged at a bracket 79 disposed at the inner side of the front panel 61. The stop portion 75c is configured to delay the start time of the closing operation of the lower door 65.

It is noted that a middle portion of the upper door lever 71 and the second arm portion 75b of the lower door lever 75 are interconnected by the link 77.

Also, the end of the arm portion 71a of the upper door lever 71 is positioned at the Y1 side of the pin 64, and the first arm portion 75a is positioned at the Y2 side of the pin 66.

When the upper door lever 71 is rotated in the clockwise direction, the lower door lever 75 is rotated in the counterclockwise direction via the link 77. When the upper door lever 71 is rotated in the counterclockwise direction, the lower door lever 75 is rotated in the clockwise direction via the link 77.

[Upper Door Opening Mechanism 90]

As is shown in FIGS. 3, 4, and 5A, the upper door opening mechanism 90 includes an upper door opening lever 91. The upper door opening lever 91 has a hole 91a, a first arm portion 91b at the Y2 side of the hole 91a, and a second arm portion 91c at the Y1 side of the hole 91a. The second arm portion 91c has a cam roller 92 arranged at its end.

The upper door opening lever 91 has the hole 91a engaging a stationary pin 93 to be rotatably supported at a side panel 92 of the streamer apparatus 30. The upper door opening lever 91 has a force applied in the counterclockwise direction by a spring (not shown). The end of the first arm portion 91b is positioned at the Z2 side of the pin 64.

The pin 92 is positioned at a certain height so that it may oppose the cam portion 56 of the cam plate 55.

As is shown in FIG. 2, the cam plate 55 is moved in the Y2 direction and the cam portion 56 is positioned at the Y2 side with respect to the cam roller 92.

[Motion of the Tape Cartridge Slot Door Mechanism 60 upon Loading a Tape Cartridge]

[Motion during Insertion of New Tape Cartridge 20]

In the following, referring to FIGS. 7A through 10B, the motion of the tape cartridge slot door mechanism 60 is described when an operator inserts the new tape cartridge 20 into the tape cartridge slot 62 to a predetermined position at which the new tape cartridge 20 is stopped by a stopper. It is noted that FIGS. 7B, 9B, and 10B are enlarged views illustrating the motion of the interlocking mechanism 70.

Figure 7A:
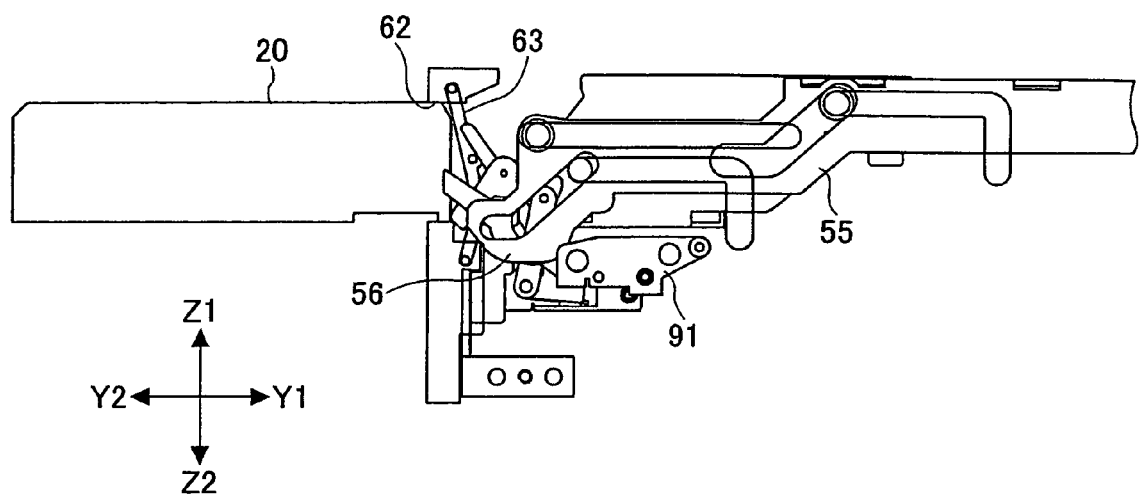
FIGS. 7A and 7B are side views of the tape cartridge slot door mechanism when insertion of a tape cartridge is started.
Figure 7B:
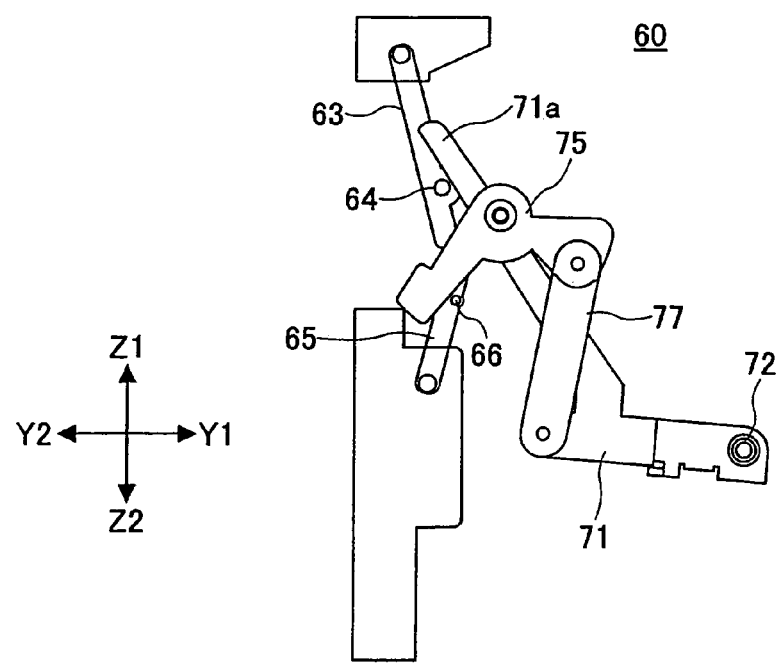

Since the upper door 63 is positioned at the Y2 side with respect to the lower door 65, the tape cartridge 20 comes into contact with the upper door 63 upon being inserted, and the upper door 63 is pushed by the tape cartridge 20 to be rotated in the counterclockwise direction as is shown in FIG. 7A. In turn, as is shown in FIG. 7B, the arm portion 71a is pushed by the pin 64, the upper door lever 71 is rotated in the clockwise direction, the lower door lever 75 is rotated in the counterclockwise direction via the link 77, the first arm portion 75a pushes the pin 66, and the lower door 65 is rotated in the clockwise direction. In other words, when the upper door 63 is rotated in the opening direction, the lower door also rotates in the opening direction.

Figure 8:
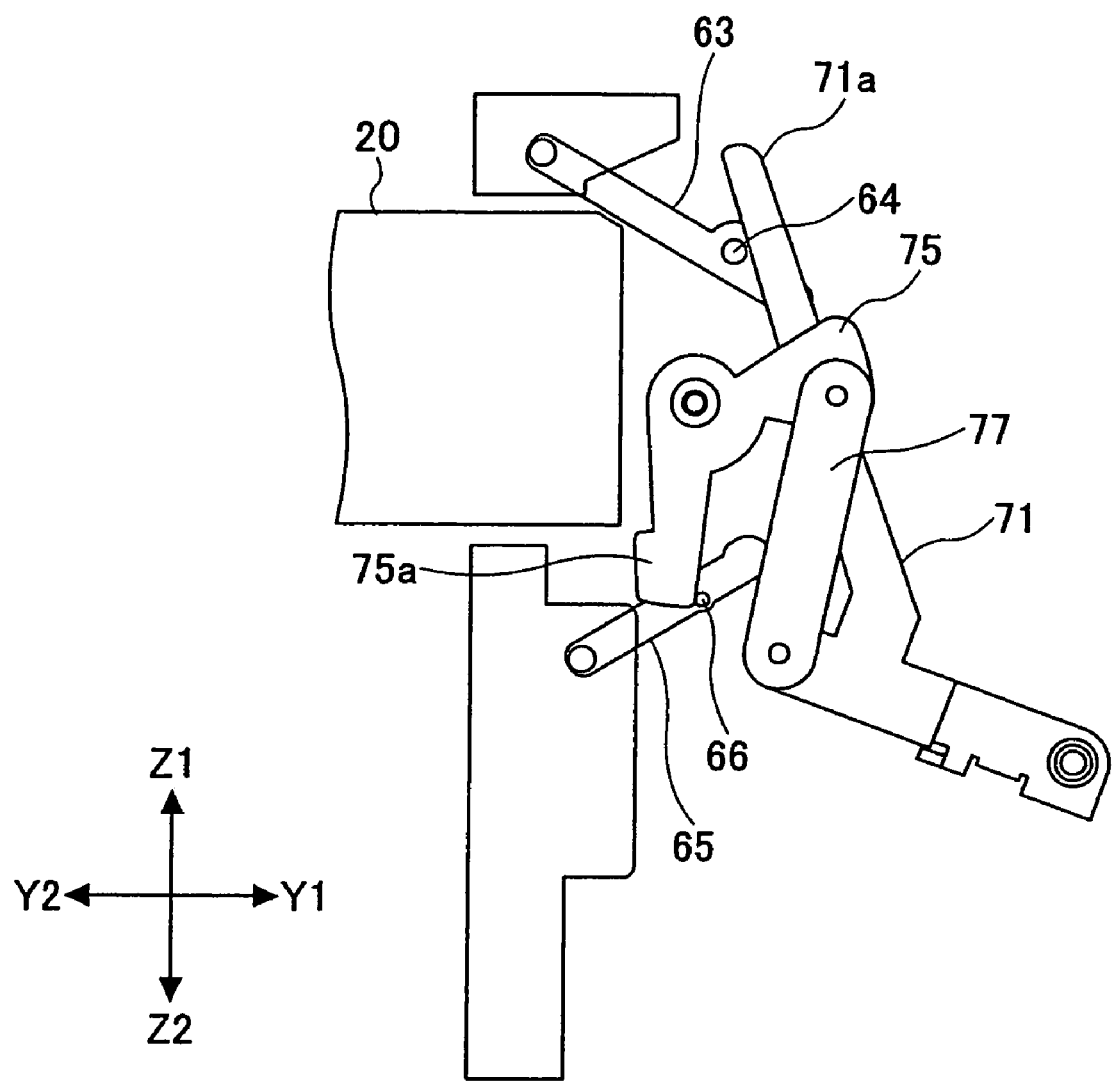
FIG. 8 is a side view of the tape cartridge slot door mechanism when the tape cartridge is inserted further.

When the new tape cartridge 20 is inserted further, the upper door 63 is pushed open further, the component parts of the interlocking mechanism 70 may be moved to positions as is shown in FIG. 8, and the lower door 65 may be opened further.

Figure 9A:
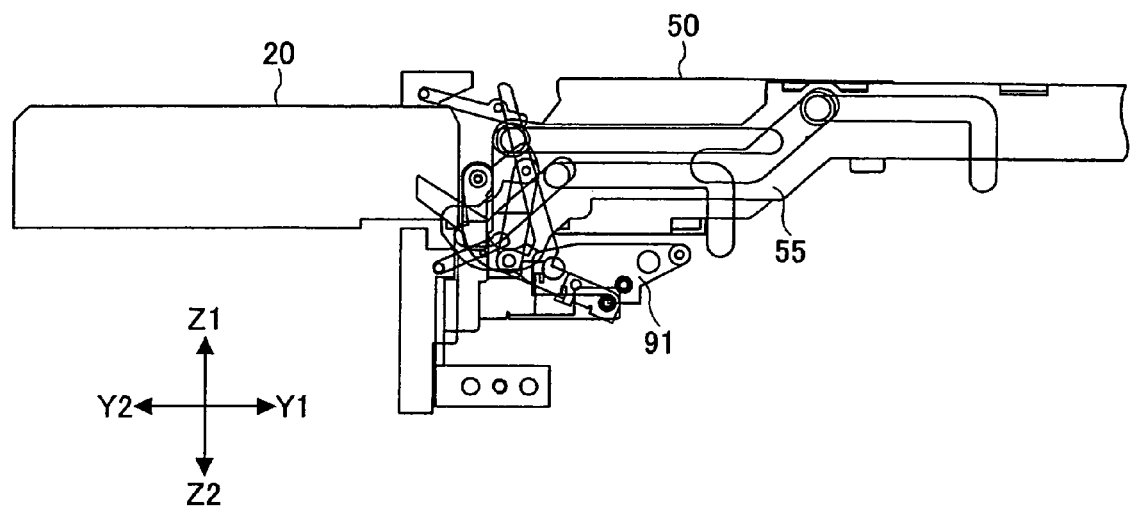
FIGS. 9A and 9B are side views of the tape cartridge slot door mechanism when the tape cartridge is inserted further.
Figure 9B:
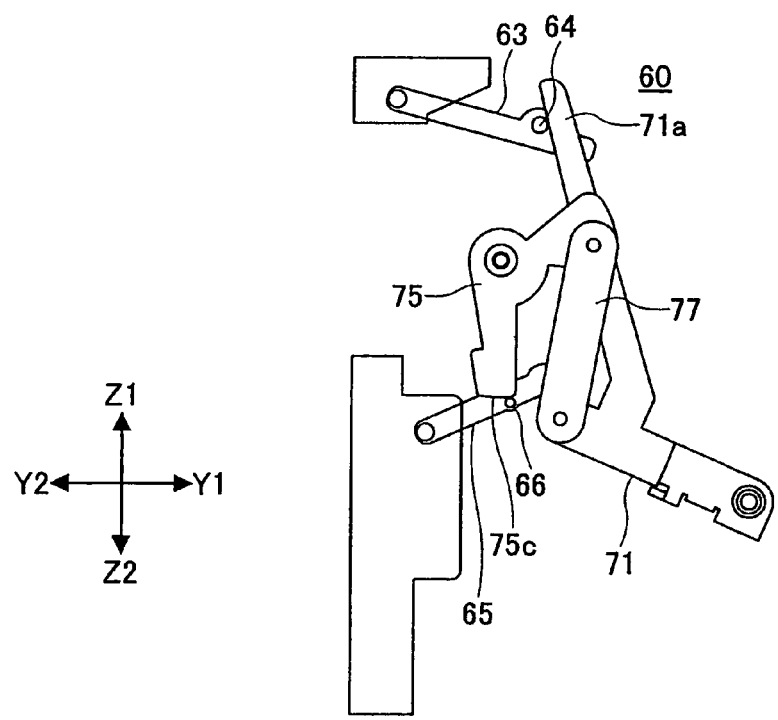

When the new tape cartridge 20 is inserted further as is shown in FIG. 9A, the upper door 63 is pushed open further, the component parts of the interlocking mechanism 70 may be moved to positions as is shown in FIG. 9B, and the lower door 65 is opened further. In FIG. 9B, the pin 66 is stopped by the stop portion 75c of the lower door lever 75, and the lower door 65 is opened to a fully open position. When the tape cartridge 20 is pushed further, the upper door 63 is pushed further to be opened to a fully open position while the lower door 65 maintains its fully open position.

Figure 10A:
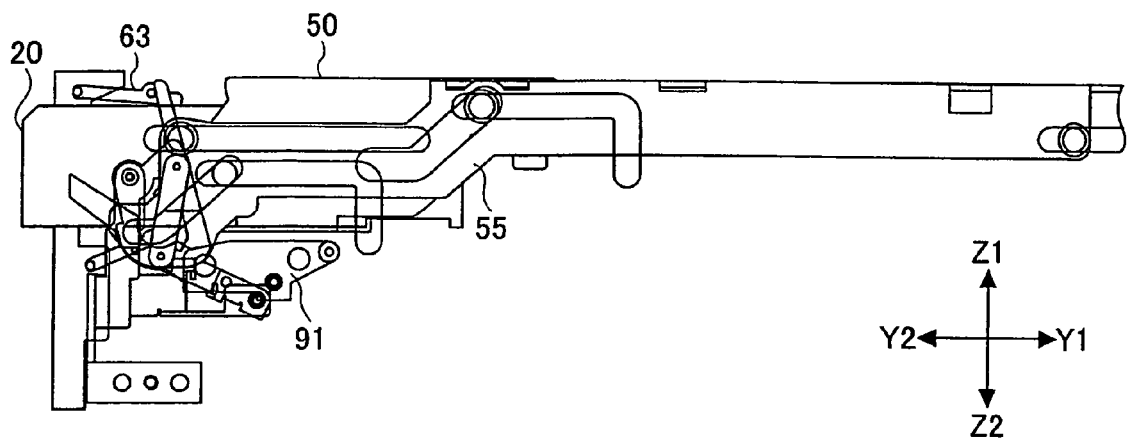
FIGS. 10A and 10B are side views of the tape cartridge slot door mechanism when the tape cartridge is inserted to its final position.
Figure 10B:
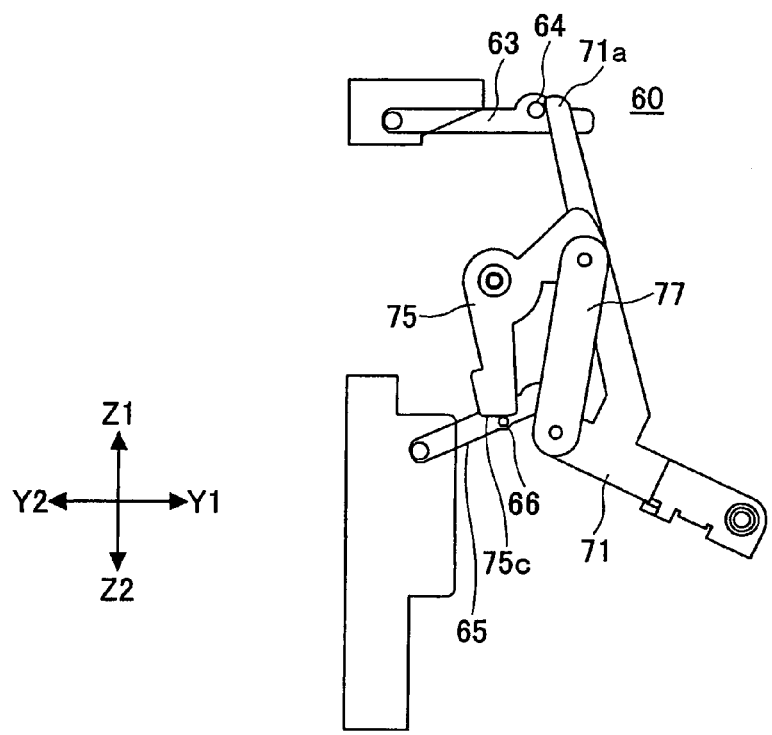

FIG. 10A shows the tape cartridge slot door mechanism 60 when the tape cartridge 20 is inserted through the tape cartridge slot 62 to reach a predetermined position inside the tape cartridge holder 50. FIG. 10B shows the interlocking mechanism 70 in this case. As is shown in these drawings, the upper door 63 is supported by the upper face of the tape cartridge 20 at the fully open position, and the lower door 65 is also maintained at its fully open position. It is noted that FIG. 5B is a skeletal view of the tape cartridge slot door mechanism 60 in such a case.

[Motion of Tape Cartridge Slot Door Mechanism 60 when New Tape Cartridge 20 is pulled in by Motor]

FIGS. 11A through 14B illustrate the motion of the tape cartridge slot door mechanism 60 when the new tape cartridge 20 is pulled in by a motor. It is noted that FIGS. 11B, 12B, 13B, and 14B are enlarged views illustrating the motion of the interlocking mechanism 70.

When the new tape cartridge 20 is inserted through the tape cartridge slot 62 and into the tape cartridge holder 50 to reach a predetermined position, the motor is driven, the cam plate 55 is moved in the Y1 direction, the tape cartridge holder 50 is moved in the Y1 direction, and the new tape cartridge 20 is drawn inside the streamer apparatus 30.

Figure 11A:
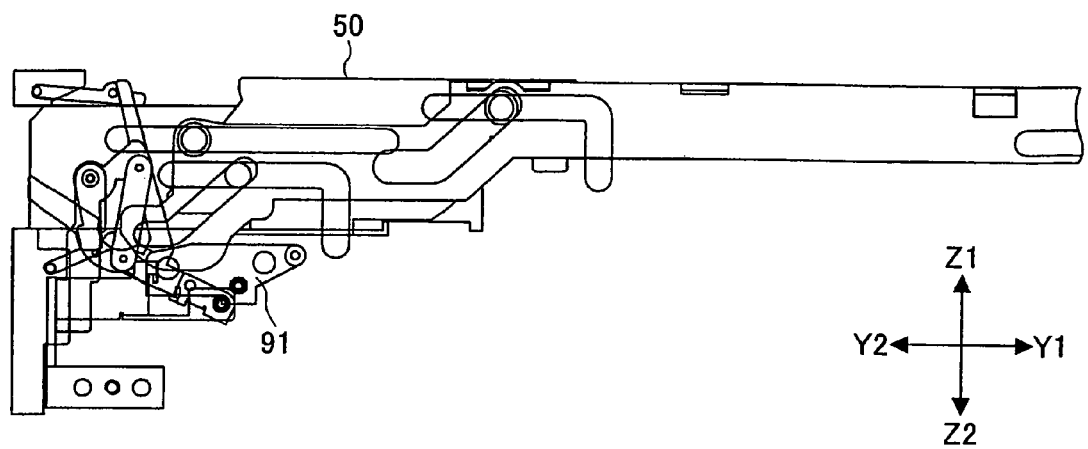
FIGS. 11A and 11B are side views of the tape cartridge slot door mechanism immediately after a tape cartridge loading operation is started.
Figure 11B:
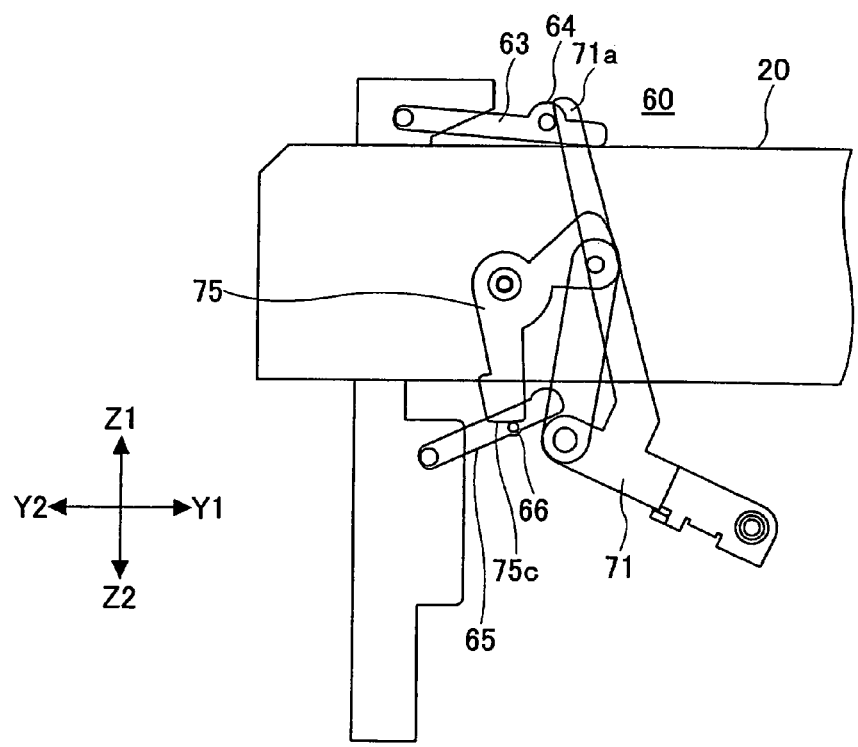

In this case, the component parts of the tape cartridge slot door mechanism 60 are arranged at positions shown in FIGS. 11A and 11B. It is noted that the interconnecting mechanism 70 remains in the position shown in FIG. 10B during initial stages of the above process.

Figure 12A:
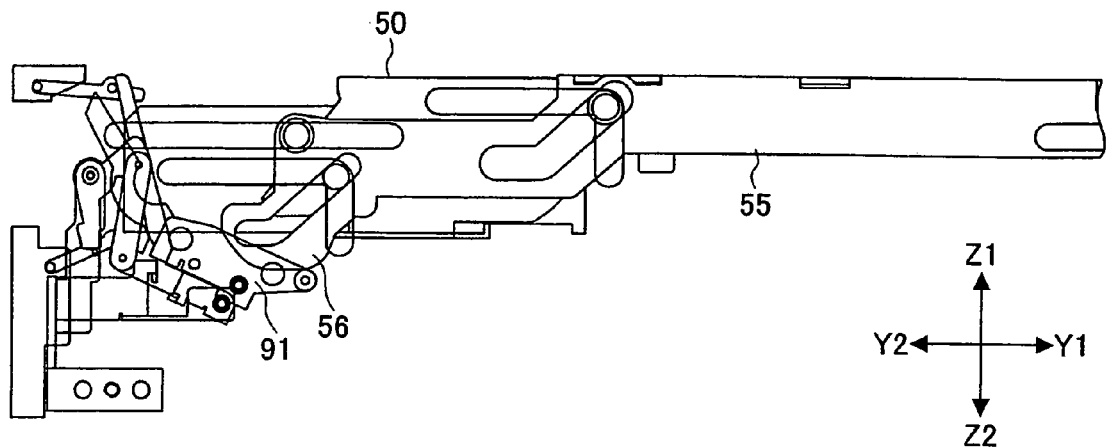
FIGS. 12A and 12B are side views of the tape cartridge slot door mechanism when the tape cartridge loading operation advances further.
Figure 12B:
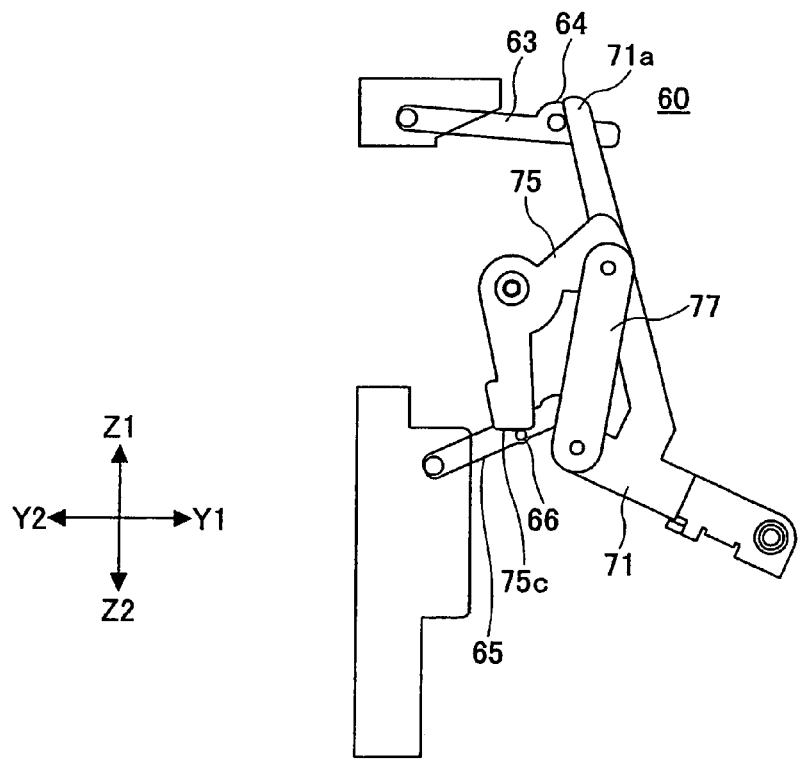

Then, as is shown in FIG. 12A, the cam plate 55 is moved in the Y1 direction, the cam portion 56 pushes down the cam roller 92 in the Z2 direction, and the upper door opening lever 91 is rotated in the clockwise direction. In this case, the upper door opening lever 91 idles since the upper door 63 is already opened to a substantially fully open position. The component parts of the interconnecting mechanism 70 may be arranged at positions shown in FIG. 12B.

Figure 13A:
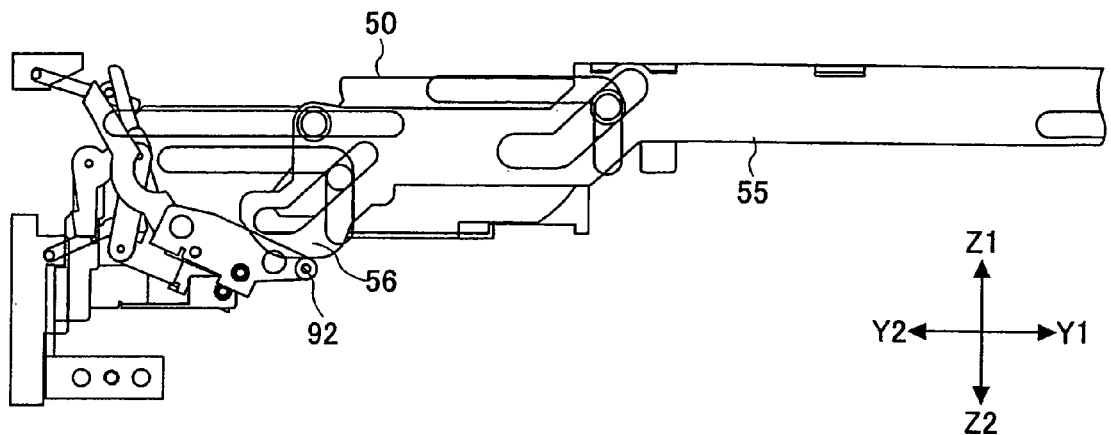
FIGS. 13A and 13B are side views of the tape cartridge slot door mechanism when the tape cartridge loading operation advances further.

When the cam plate 55 is moved in the Y1 direction, the tape cartridge holder 50 starts moving downward in the Z2 direction as is shown in FIG. 13A. In turn, the new tape cartridge 20 also starts moving in the Z2 direction along with the tape cartridge holder 50, and the upper door 63 that has been supported by the upper face of the new tape cartridge 20 starts to close.

Figure 14A:
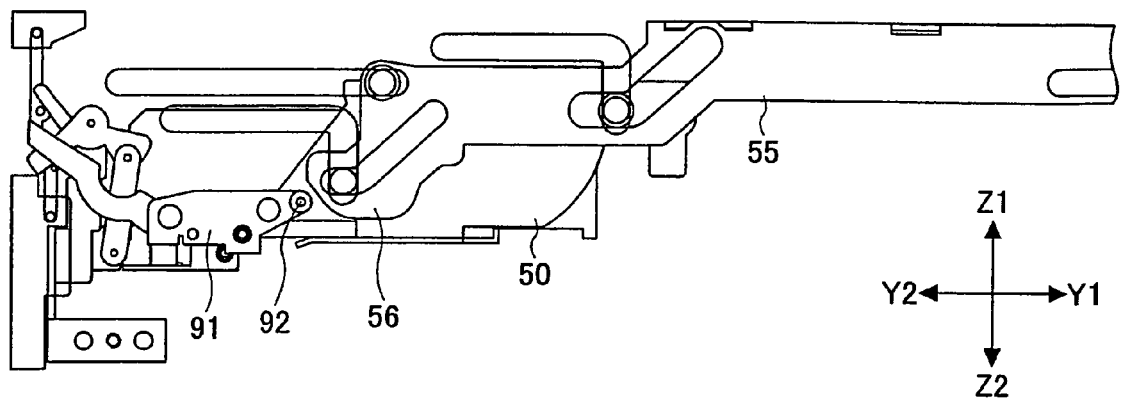
FIGS. 14A and 14B are side views of the tape cartridge slot door mechanism when the tape cartridge loading operation is completed.
Figure 14B:
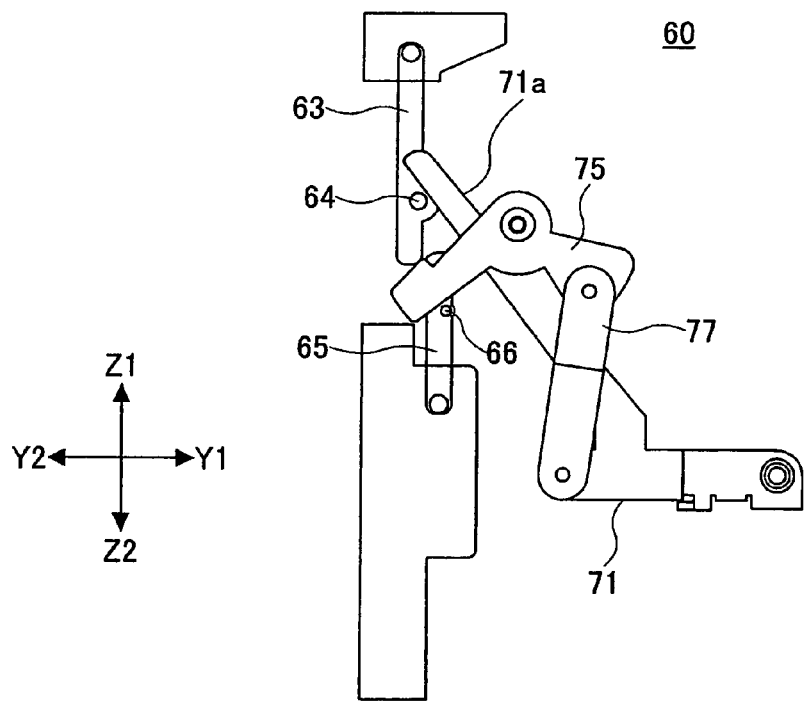

When the cam plate 55 is moved in the Y1 direction to reach its final position, the tape cartridge holder 50 moves further downward in the Z2 direction, and the new tape cartridge 20 is also lowered in the Z2 direction to be loaded in the streamer apparatus 30 as is shown in FIG. 14A. Also, the cam portion 56 moves past the cam roller 92, and the upper door opening lever 91 is rotated in the counterclockwise direction to return to its original position. In FIGS. 14A and 14B, the upper door 63 is at a closed position.

Figure 13B:
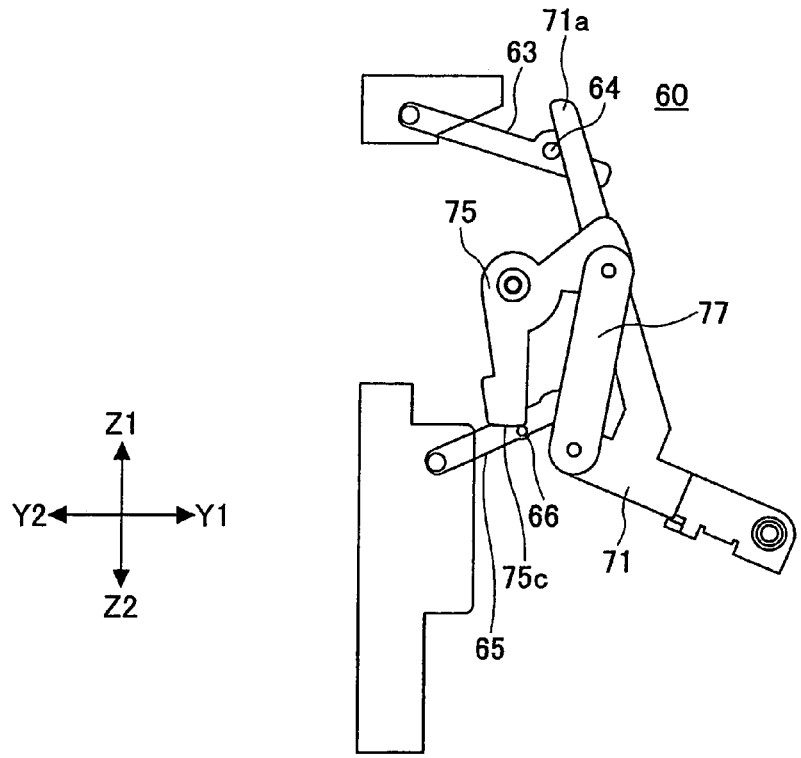

When the upper door 63 starts to close as is shown in FIG. 13A, the component parts of the interlocking mechanism 70 are arranged at positions as is shown in FIG. 13B where the pin 66 is stopped by the stop portion 75c. Accordingly, the lower door 65 maintains its fully open position. The pin 66 is released from the stop portion 75c at a point where the upper door 63 is halfway closed, and in turn, the lower door starts to close. In other words, the closing motion of the lower door 65 is slightly delayed with respect to the closing motion of the upper door 63. In FIGS. 14A and 14B, the lower door 65 is positioned at the Y1 side of the upper door 63. Specifically, the upper door 63 and the lower door 65 are moved to positions identical to their initial positions shown in FIG. 3. The component parts of tape cartridge slot door mechanism 60 are arranged at positions shown in FIG. 6A.

It is noted that even when an object other than a tape cartridge is inserted into the tape cartridge slot 62 and extracted therefrom, the closing motion of the lower door 65 is started slightly after the closing motion of the upper door 63.

[Motion of Tape Cartridge Slot Door Mechanism 60 when Tape Cartridge is Ejected]

In response to an ejection command, the motor is activated to start reverse rotation. In turn, the tape cartridge loading mechanism moves in a direction opposite its moving direction during loading, the cam plate 55 moves in the Y2 direction, and the tape cartridge holder 50 starts moving in the Z1 direction.

Figure 15:
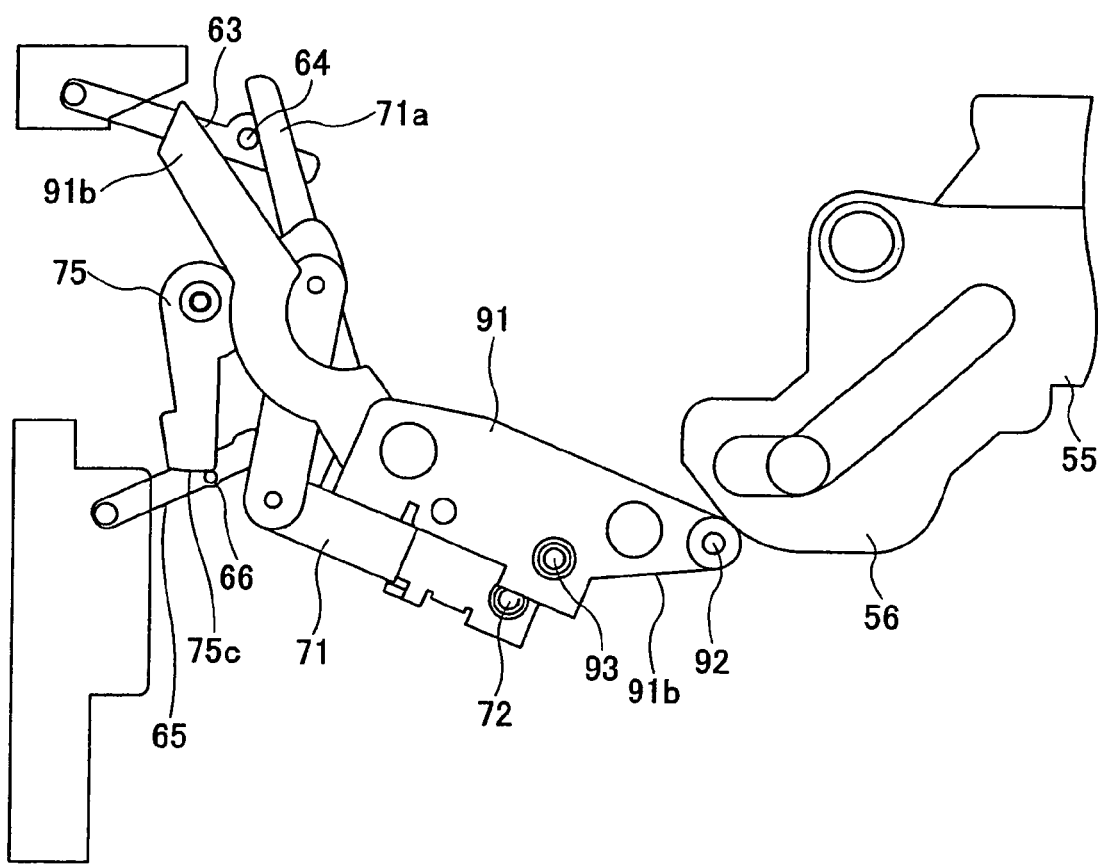
FIG. 15 is a side view of the tape cartridge slot door mechanism immediately after a tape cartridge ejecting operation is started.

In this case, as is shown in FIG. 15 and FIG. 6B, the Y2 side portion of the cam portion 56 pushes the cam roller 92, the upper door opening lever 91 is rotated in the clockwise direction, the first arm portion 91b stops the pin 64, and the upper door is opened. Further, the lower door 65 is opened via the interlocking mechanism 70. Specifically, the upper door 63 and the lower door 65 are opened before the Y2 side of the tape cartridge 20 reaches the tape cartridge slot 62.

Then, as is shown in FIGS. 10A and 10B, a portion of the tape cartridge 20 at the Y2 side protrudes out of the tape cartridge slot 62 with the upper door 63 and the lower door 65 at open positions.

In this case, the cam portion 56 passes the cam roller 92, the upper door opening lever 91 rotates in the counterclockwise direction to return to its original position.

Then, when the operator grabs hold of and pulls out the tape cartridge 20 from the tape cartridge slot 62, the upper door 63 is closed, and the lower door 65 is closed via the interlocking mechanism 70. By arranging the stop portion 75c, the lower door 65 starts its closing motion slightly after the closing motion of the upper door 63 so that the lower door 65 is positioned at the Y1 side of the upper door 63 as is shown in FIGS. 2 and 3.

It is noted that the tape cartridge slot door mechanism 60 performs operations similar to those described above in the case where the current tape cartridge 10 is loaded as well.

Also, in an alternative embodiment, the lower door 65 may be positioned at the Y2 side of the upper door 63.

Further, it is noted that the present invention is not limited to the specific embodiments described above, and variations and modifications may be made without departing from the scope of the present invention.

The present application is based on and claims the benefit of the earlier filing date of Japanese Patent Application No. 2005-310328 filed on Oct. 25, 2005, the entire contents of which are hereby incorporated by reference.

What is claimed is:

1. A cartridge slot door mechanism that covers a cartridge slot arranged at a front panel of a frame, the cartridge slot door mechanism comprising:
    an upper door having an upper side supported by the front panel;
    a lower door having a lower side supported by the front panel; and
    an interlock mechanism including an upper door lever correlated with the upper door, a lower door lever correlated with the lower door and a link connected to the upper door lever and lower door lever, wherein the link is a rigid link;
    wherein the upper door and the lower door are configured to open toward an inner side of the frame, the upper door, the lower door, the upper door lever, the link and the lower door lever being arranged such that in response to the upper door being rotated in a first direction, the lower door is rotated in an opposite direction; and
    a lower side portion of the upper door and an upper side portion of the lower door are arranged to overlap.

2. The cartridge slot door mechanism as claimed in claim 1, wherein:
    the interlocking mechanism causes the lower door to open in accordance with an opening motion of the upper door and causes the lower door to close in accordance with a closing motion of the upper door;
    the upper door covers at least half an open area of the cartridge slot; the lower door covers a remaining open area of the cartridge slot; and
    the upper side portion of the lower door is arranged on an inner side of the upper door and overlaps with the lower side portion of the upper door.

3. The cartridge slot door mechanism as claimed in claim 2, wherein
    the interlocking mechanism includes a stop portion that stops the lower door at an open position while rotating a predetermined angle; and
    the interlocking mechanism is configured to maintain the lower door at the open position for a time after the closing motion of the upper door is started and delay a closing motion of the lower door.

4. The cartridge slot door mechanism as claimed in claim 2, further comprising: an upper door opening mechanism that causes the upper door to open toward the inner side of the frame from a closed position upon ejecting a cartridge.

5. The cartridge slot door mechanism as claimed in claim 1, wherein the link is a mobile link.

6. A magnetic recording/playback apparatus comprising:
    a cartridge slot door mechanism that covers a cartridge slot arranged at a front panel of a frame, the cartridge slot door mechanism including an upper door having an upper side supported by the front panel;

a lower door having a lower side supported by the front panel; and an interlock mechanism including an upper door lever correlated with the upper door, a lower door lever correlated with the lower door and a link connected to the upper door lever and lower door lever, wherein the link is a rigid link;

wherein the upper door and the lower door are configured to open toward an inner side of the frame, the upper door, the lower door, the upper door lever, the link and the lower door lever being arranged such that in response to the upper door being rotated in a first direction, the lower door is rotated in an opposite direction; and a lower side portion of the upper door and an upper side portion of the lower door are arranged to overlap.

7. The magnetic recording/playback apparatus of claim 6, wherein in the cartridge slot door mechanism, the link is a mobile link.

8. A cartridge slot door mechanism that covers a cartridge slot arranged at a front panel of a frame, the cartridge slot door mechanism comprising:

an upper door having an upper side supported by the front panel; and a lower door having a lower side supported by the front panel, the upper door and the lower door being configured to open toward an inner side of the frame; and a lower side portion of the upper door and an upper side portion of the lower door are arranged to overlap;

an interlocking mechanism that causes the lower door to open in accordance with an opening motion of the upper door and causes the lower door to close in accordance with a closing motion of the upper door;

wherein the upper door covers at least half an open area of the cartridge slot;

the lower door covers a remaining open area of the cartridge slot;

the upper side portion of the lower door is arranged on an inner side of the upper door and overlaps with the lower side portion of the upper door;

the interlocking mechanism includes a stop portion that stops the lower door at an open position while rotating a predetermined angle; and the interlocking mechanism is configured to maintain the lower door at the open position for a time after the closing motion of the upper door is started and delay a closing motion of the lower door.

9. A cartridge slot door mechanism that covers a cartridge slot arranged at a front panel of a frame, the cartridge slot door mechanism comprising:

an upper door having an upper side supported by the front panel;

a lower door having a lower side supported by the front panel; and an interlock mechanism including an upper door lever correlated with the upper door, a lower door lever correlated with the lower door and a link connected to the upper door lever and lower door lever;

wherein the upper door and the lower door are configured to open toward an inner side of the frame, the upper door, the lower door, the upper door lever, the link and the lower door lever being arranged such that in response to the upper door being rotated in a first direction, the lower door is rotated in an opposite direction; and a lower side portion of the upper door and an upper side portion of the lower door are arranged to overlap, wherein:

the upper door, the lower door, the upper door lever, the lower door lever and the link are arranged such that in response to the upper door being rotated in a first direction, the upper door lever actuates the link, which in turn actuates the lower door lever to rotate the lower door in an opposite direction.

10. A magnetic recording/playback apparatus comprising:

a cartridge slot door mechanism that covers a cartridge slot arranged at a front panel of a frame, the cartridge slot door mechanism including an upper door having an upper side supported by the front panel;

a lower door having a lower side supported by the front panel; and an interlock mechanism including an upper door lever correlated with the upper door, a lower door lever correlated with the lower door and a link connected to the upper door lever and lower door lever;

wherein the upper door and the lower door are configured to open toward an inner side of the frame, the upper door, the lower door, the upper door lever, the link and the lower door lever being arranged such that in response to the upper door being rotated in a first direction, the lower door is rotated in an opposite direction; and a lower side portion of the upper door and an upper side portion of the lower door are arranged to overlap, wherein in the cartridge slot door mechanism, the upper door, the lower door, the upper door lever, the lower door lever and the link are arranged such that in response to the upper door being rotated in a first direction, the upper door lever actuates the link, which in turn actuates the lower door lever to rotate the lower door in an opposite direction.

* * * * *